United States Patent

White

[11] 4,053,180
[45] Oct. 11, 1977

[54] AUTOMOBILE SUN VISOR

[76] Inventor: Fred C. White, 1210 S. Bailey St., Seattle, Wash. 98108

[21] Appl. No.: 688,353

[22] Filed: May 20, 1976

[51] Int. Cl.² ............................................. B60J 3/02
[52] U.S. Cl. ................................................ 296/97 K
[58] Field of Search ............... 296/97 G, 97 R, 97 B, 296/97 C, 97 E, 97 H, 97 K

[56] References Cited

U.S. PATENT DOCUMENTS

| 2,625,426 | 1/1953 | Weymouth | 296/97 K |
| 3,304,118 | 2/1967 | Jonas | 296/97 R |
| 3,853,370 | 12/1974 | Barnhart | 296/97 G |

Primary Examiner—Philip Goodman
Attorney, Agent, or Firm—Seed, Berry, Vernon & Baynham

[57] ABSTRACT

An automobile sun visor is provided with a transparent glare-reducing plate which is releasibly attached to a rod connected to the automobile. The plate releasible attaching means is in the form of clips having rearwardly facing open ends so that a forward impact on the plate will release the plate from the rod. An attachment having a transparent glare-reducing second plate is also releasibly attached to the rod in the same manner but positionable in parallel relationship to the first plate so that the viewer will see a still further substantially reduced glare. All of the securing means are releasible upon a forwardly directed impact on the plates.

4 Claims, 2 Drawing Figures

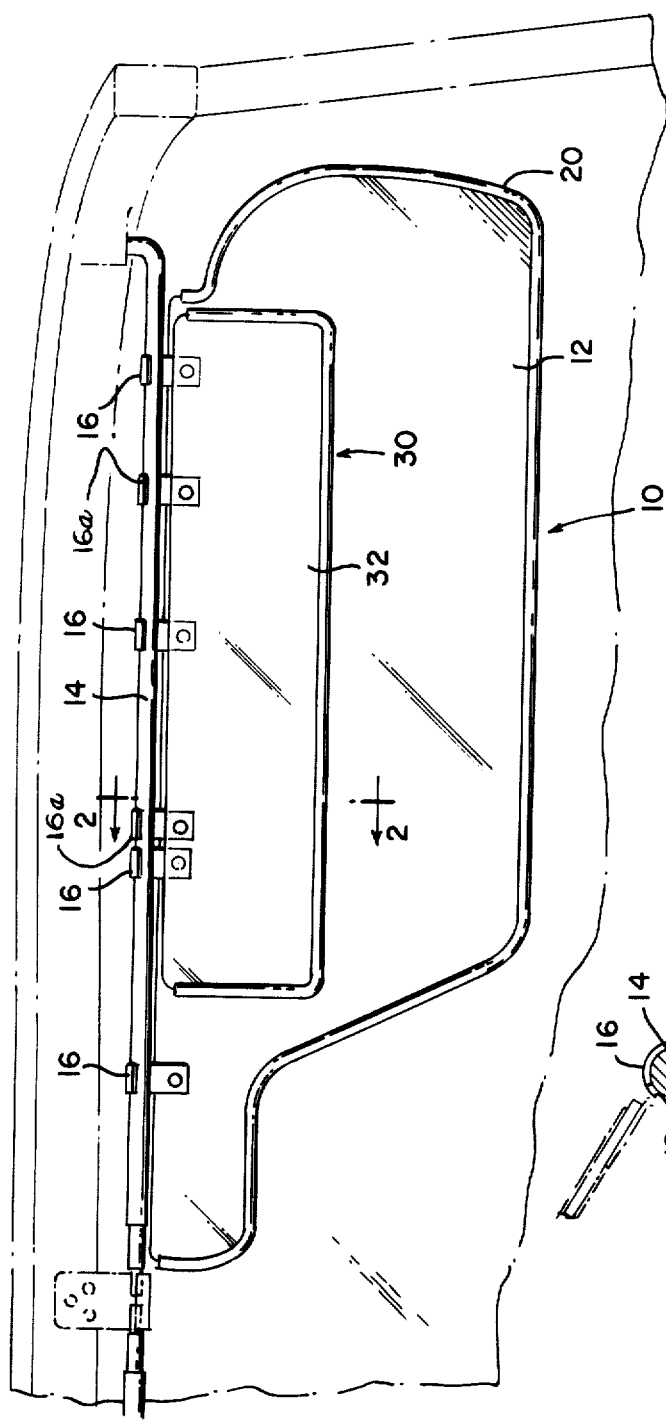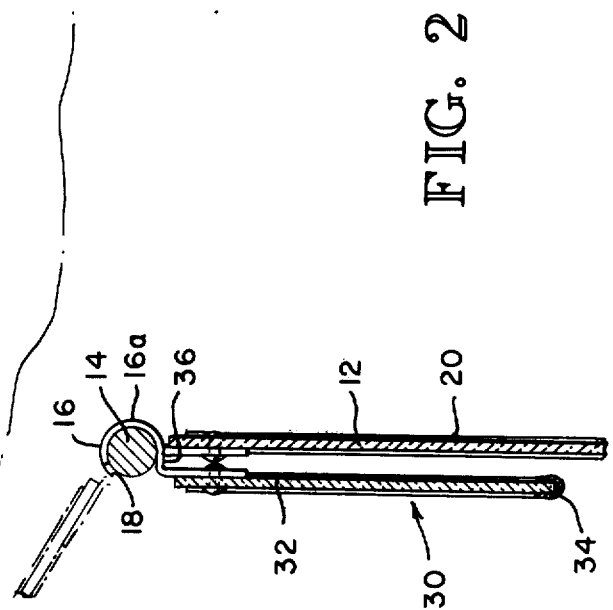
FIG. 1
FIG. 2

4,053,180

AUTOMOBILE SUN VISOR

BACKGROUND OF THE INVENTION

1. Field of the Invention

This invention pertains to transparent glare-reducing automobile sun visors and to attachments to such visors.

2. Description of the Prior Art

Various types of transparent plastic sun visors have been used heretofore. One of the dangers in using a transparent glare-reducing visor is that it can shatter upon impact causing injury to the occupant of the automobile. In addition, the visors heretofore employed have used a single glare-reducing layer which, while adequate for one level of incoming glare, are inadequate for a greater amount of glare. If the visor material would be darkened or otherwise adequate for the large amount of glare, it then necessarily reduced visibility during periods when there was a lesser amount of incoming glare.

SUMMARY OF THE INVENTION

It is a first object of this invention to provide a transparent glare-reducing sun visor that is releasibly attached to the vehicle so that a forwardly directed impact on the visor will release it from the vehicle.

It is still another object of this invention to provide an attachment for a transparent glare-reducing advisor in which the attachment provides a selective further reduction in glare.

Basically, these objects are obtained by mounting the visor and the attachment to an elongated rod secured to the vehicle by clip means which will release from the rod upon a forwardly directed impact on the attachment or the visor. The attachment is secured to the rod in a manner such that it can be positioned in parallel relationship to the visor for selectively increasing the layers of glare-reducing material between the windshield and the viewer.

BRIEF DESCRIPTION OF THE FIGURES OF THE DRAWING

FIG. 1 is a fragmentary elevation of a visor and an attachment embodying the principles of the invention.

FIG. 2 is a fragmentary vertical section taken along the line 2—2 of FIG. 1.

DETAILED DESCRIPTION OF THE PREFERRED EMBODIMENT

A visor 10 includes a first plate 12 for transparent glare-reducing plastic such as manufactured under the trademark Plexiglas. The details of this plastic or equivalent are well known in the art and will not be further described. The first plate is secured to a rod 14 by a plurality of spaced clips 16. While the rod 14 is shown integral with the vehicle, the rod normally provided on the vehicle can be cut off and rod 14 spliced onto the remaining stub. As best shown in FIG. 2, each clip has an open end 18 facing rearwardly. The clips ar pressed onto the rod but with a forwardly directed impact on the plate the clips will release the plate from the rod. A resilient bead 20 is preferably secured along the edge of the plate to provide protection against the sharp edges of the plate.

As best shown in FIG. 2, an attachment 30 includes a transparent glare-reducing second plate 32 again of plastic and preferably of a glare-reducing capability greater than that of the first plate. Clips 16a attach the second plate to the rod 14. The clip 16a are substantially identical to the clips 16 of the first plate with the exception that the former each have an elongated leg 36 which spaces the second plate 32 rearwardly of the first plate so that the second plate can be disposed in parallel relationship to the first plate.

While the clips 16 and 16a hold the plates on the rod they also allow the plates to be swung upwardly either together or one at a time out of the vision of the viewer. The second plate also has its edge covered by a protective resilient bead 34.

As is readily apparent, with one level of glare coming in through the windshield, the larger first plate is moved down in front of the windshield. If there is a temporary increase in the glare such as when the vehicle is being driven into a sunlight on the horizon, the second plate can be swung down. In the event of an accident, both plates will break free of the rod prior to shattering.

While the preferred embodiments of the invention have been illustrated and described, it should be apparent that variations will be apparent to one skilled in the art. Accordingly, the invention is not to be limited to the specific forms illustrated in the drawing.

The embodiments of the invention in which a particular property or privilege is claimed are defined as follows:

1. An automobile visor for reducing glare, comprising:
   a horizontally disposed elongated rod mounted above the automobile windshield,
   a transparent glare-reducing visor,
   releasible means securing the visor to the rod for providing release of the visor from the rod during a forward impact on the visor,
   said releasable securing means including a plurality of spaced curved friction clips each having an open end facing rearwardly and pressed over said rod whereby a forward impact on the visor will force open the open ends of the clips to release the visor from the rod,
   an auxiliary transparent glare reducing plate releasibly secured to said rod with the auxiliary glare reducing plate adapted to overlie said visor in parallel relationship, and
   a plurality of similar clips mounting said glare reducing plate on said rod in a similar manner whereby a forward impact on the auxiliary glare reducing plate will force open the ends of the clips and the release of the plate from said rod.

2. An automobile visor as in claim 1 including a resilient material secured along the edges of said visor and auxiliary glare reducing plate.

3. An automobile visor as in claim 1 wherein the auxiliary glare reducing plate has greater glare reducing properties than the visor.

4. An automobile visor as in claim 1 wherein the visor is substantially lareger in surface area than the auxiliary glare reducing plate.

* * * * *